United States Patent [19]

Agata et al.

[11] Patent Number: 5,443,320
[45] Date of Patent: Aug. 22, 1995

[54] INFORMATION PROCESSING SYSTEM WITH PRINTING FUNCTION

[75] Inventors: Hiroaki Agata, Yokohama; Toshitaka Imai, Sagamihara; Noboru Kamijo, Fujisawa; Toshiki Takahashi, Yamato, all of Japan

[73] Assignee: International Business Machines Corporation, Armonk, N.Y.

[21] Appl. No.: 65,830

[22] Filed: May 21, 1993

[30] Foreign Application Priority Data

May 21, 1992 [JP] Japan .................................. 4-128498

[51] Int. Cl.⁶ .................................................. B41J 11/58
[52] U.S. Cl. .................................... 400/715; 400/624; 248/118.1; 361/680
[58] Field of Search ............... 400/691, 692, 715, 82, 400/624; 248/118.1; 346/145; 347/108; 361/680

[56] References Cited

U.S. PATENT DOCUMENTS

| | | | |
|---|---|---|---|
| 4,718,783 | 1/1988 | Tsushima et al. | 400/642 |
| 4,830,525 | 5/1989 | Nagashima et al. | 400/691 |
| 4,840,344 | 6/1989 | Moroe | 400/691 |
| 4,995,745 | 2/1991 | Yokoi et al. | 400/642 |
| 5,015,324 | 5/1991 | Goodwin et al. | 400/691 |
| 5,074,413 | 12/1991 | Ikuta et al. | 400/691 |
| 5,186,557 | 2/1993 | Fushimi | 400/691 |
| 5,213,427 | 5/1993 | Groose et al. | 400/691 |
| 5,237,487 | 8/1993 | Dittmer et al. | 400/693 |
| 5,242,139 | 9/1993 | Aldrich | 248/118.1 |
| 5,276,527 | 1/1994 | Sugiyama et al. | 400/692 |
| 5,356,099 | 10/1994 | Sereboff | 248/118.1 |
| 5,375,800 | 12/1994 | Wilcox et al. | 248/118.1 |

*Primary Examiner*—Edgar S. Burr
*Assistant Examiner*—John S. Hilten
*Attorney, Agent, or Firm*—Martin J. McKinley

[57] ABSTRACT

A data processing system with a printing function having a system body, input means being disposed adjacently to said system body for inputting data, and printing means being disposed in the rear of said system body, in which a printing medium is supplied from between said system body and said input means to said printing means.

6 Claims, 11 Drawing Sheets

INFORMATION PROCESSING SYSTEM WITH PRINTING FUNCTION

CROSS-REFERENCES TO RELATED APPLICATIONS

Pursuant to 35 U.S.C. 119, Applicants claim the benefit of the filing date of Japanese Application No. 4-128,498 filed May 21, 1992.

BACKGROUND OF THE INVENTION

This invention pertains to data processing systems and, more particularly, to a portable personal computer system having a printer incorporated into the main body of the computer.

A data processing system having a printer is already known. For example, JA PUUMA 60-647 discloses a computer having a printer, wherein a paper stocker is disposed under a system body of the computer and the printing paper within said stocker is to be fed to an internal printer which is disposed in the rear portion of the system body. Since the system body may include a system board on which main circuits are mounted, a keyboard, a floppy disk unit, a hard disk drive, and a battery, the system body is usually heavy. On the other hand, in a computer disclosed in JA PUUMA 60-647, since said stocker is disposed under the system body, the heavy system body must be lifted to handle the printing paper within the stocker, and therefore it is not easy to handle the printing paper. Besides, in such a computer, if an insertion slot for the printing paper is formed in said stocker, such an insertion slot will be disposed in a lower position than the system body. Therefore, if it is assumed that the computer is placed on a desk, it is not easy to insert the printing paper into said insertion slot since said insertion slot is too near to the desk. In this respect, it is difficult to handle the printing paper. Further, if it is assumed that the computer is used with the rear portion of the system body lifted compared with the front portion by providing legs to the system body so as to give a proper inclination to a keyboard, said insertion slot gets still nearer the desk, it becomes still more difficult to insert the printing paper into said insertion slot, and the long printing paper which is exposed from said insertion slot is pressed upon the desk and will be bent down.

Further, JA PUPA2-175271 discloses an image formation apparatus, wherein recording means (printer) and display means (display unit) are disposed in the rear of input means (keyboard), and a recording sheet (paper) moves over the input means from the front to the rear of the input means and is to be fed to said recording means. In such an apparatus, since the recording sheet overspreads the input means, a defect that an input operation becomes difficult is pointed out, whether printing is being performed or not, when the recording sheet is set to said apparatus. Moreover, various indicators and control buttons which may be disposed adjacently to the input means in the rear of the input means, are also overspread by the recording sheet, and therefore it may become impossible for an operator to recognize information the indicators notify and to operate the buttons.

Still further, JA PUPA 3-71222 discloses a personal computer, wherein an internal printer is disposed in the rear of a liquid crystal display panel and a paper entrance to the internal printer is disposed behind the liquid crystal display panel. In such a personal computer, since the paper entrance is disposed behind the liquid crystal display panel, it is difficult to set a paper to the internal printer. Moreover, in such a personal computer, since the paper entrance and a paper exit are adjacently disposed and the direction of a paper feed is roughly opposite to that of paper ejection, the paper will be printed on the internal printer in a state that it draws a relatively small arc and is bent down. Therefore, in such a personal computer, a defect that a bend of the paper may be caused after printing is pointed out. Moreover, printing is very difficult if the paper is too hard to draw an arc.

Further, JA PUPA 3-132814 discloses an image formation apparatus, wherein a printer is disposed in the rear of a keyboard, and a liquid crystal display covers the keyboard in a state that the liquid crystal display is placed face down and the liquid crystal display moves to the rear of the printer in a state that it is being used. In such an apparatus, a defect that the liquid crystal display is covered with a recording sheet is pointed out, whether printing is being performed or not, when the recording sheet is set to the printer. Since in also such an apparatus, the recording sheet is printed in a state that it draws an arc in the printer, a defect that a bend of the paper may be caused after printing or hard recording sheet cannot be printed, is pointed out.

SUMMARY OF THE INVENTION

An object of the present invention is to provide a computer with a built-in printer, in which the printing operation does not hinder the operation of the keyboard, the display and other indicators, and in which the paper can be easily handled without bending.

Briefly, the present invention is a computer system with a built-in printer. The system includes a system body, data input means disposed adjacent to the system body, and a printer disposed in the rear of the system body in which paper is supplied between the system body and the data input means.

DESCRIPTION OF THE ILLUSTRATIVE EMBODIMENTS

Figure 1:
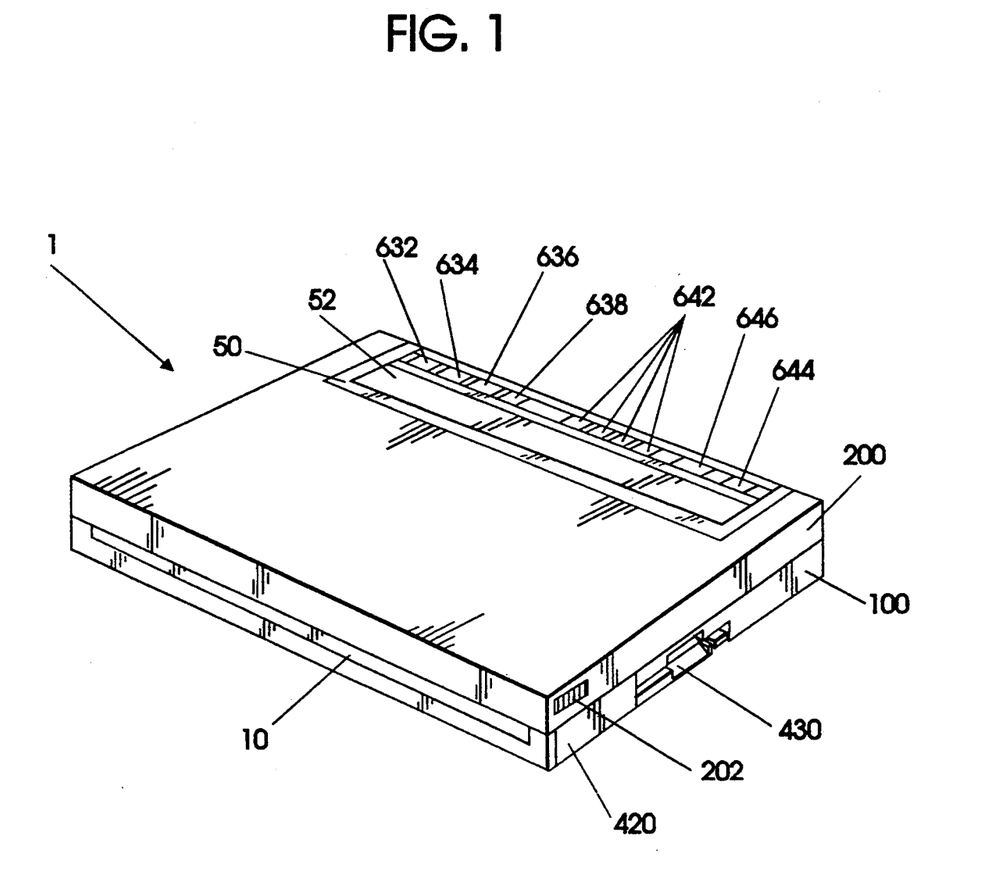
FIG. 1 is a front perspective view of a first embodiment of the present invention with the cover in the closed position.
Figure 2:
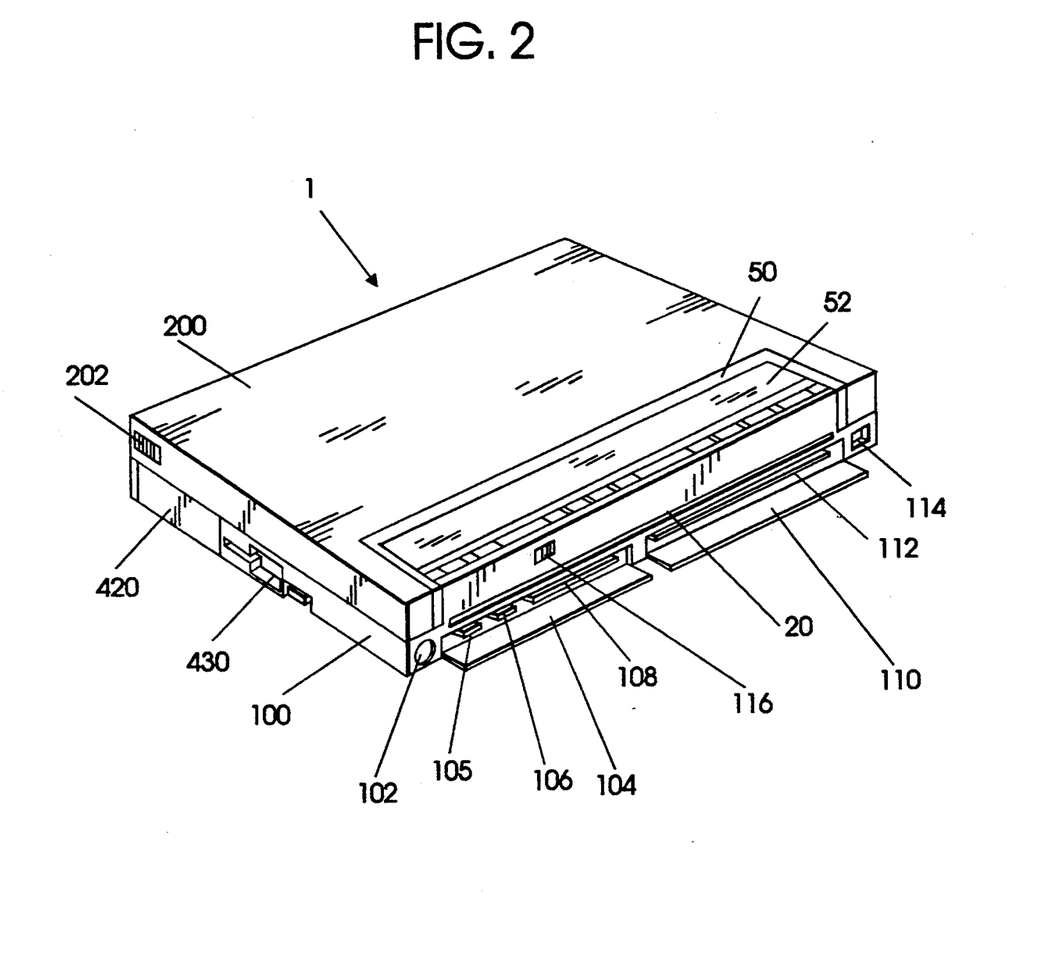
FIG. 2 is a rear perspective view of the first embodiment of the present invention with the cover closed.
Figure 3:
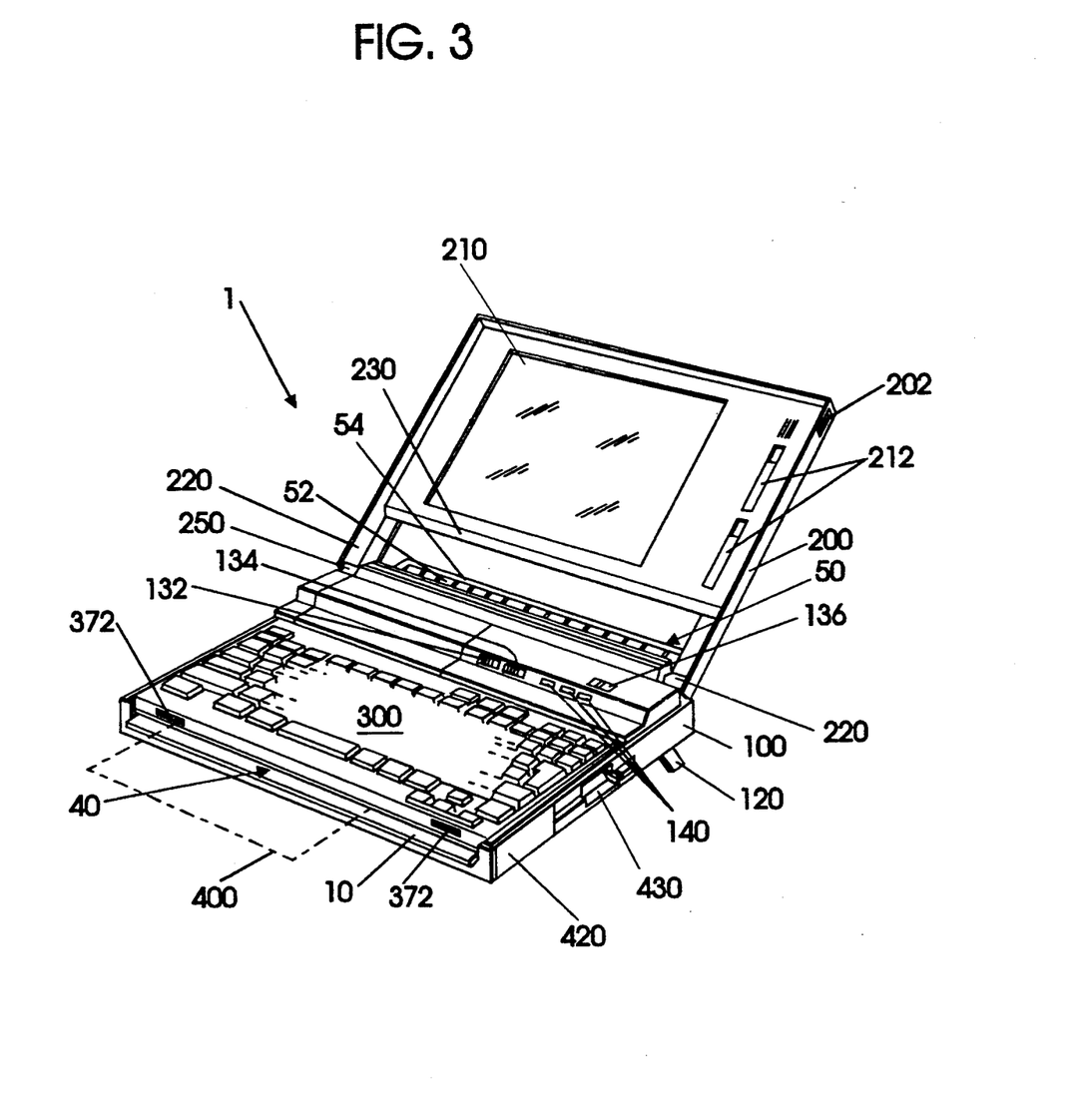
FIG. 3 is a front perspective view of the first embodiment of the present invention with the cover, leg members, entrance cover, and exit tray in the open position.
Figure 8:
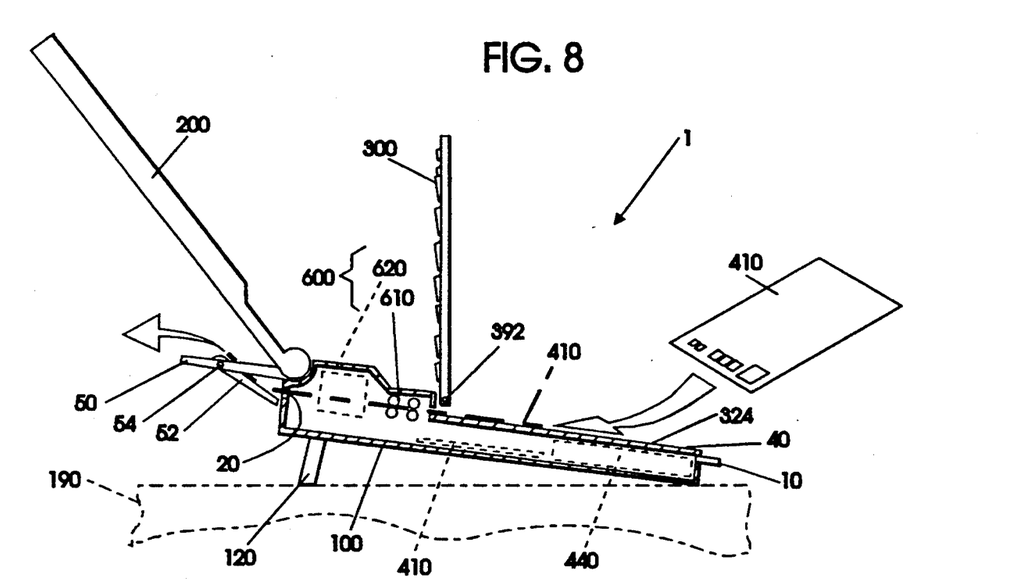
FIG. 8 is a sectional view (in which detail has been omitted) of the first embodiment of the present invention wherein an envelope or the like is being inserted into the system.
Figure 9:
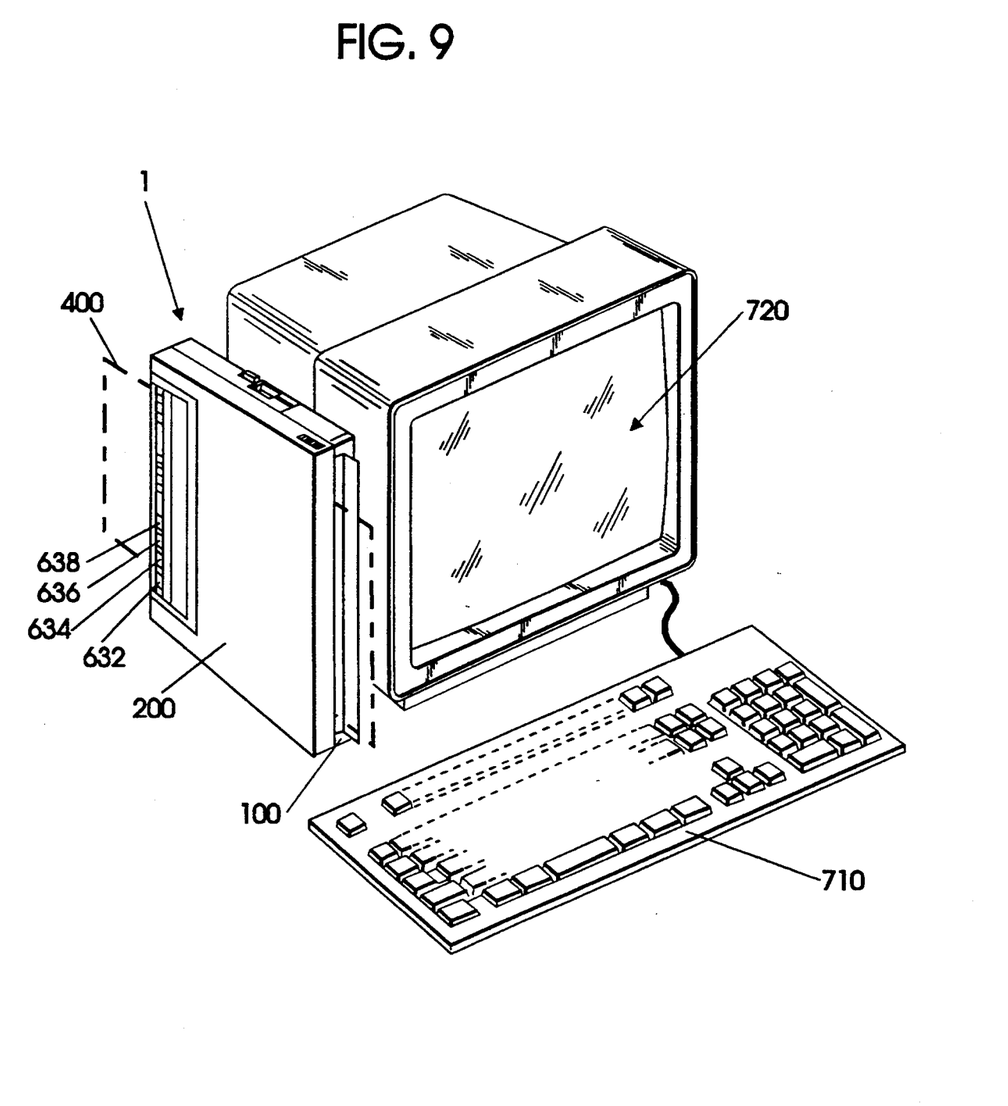
FIG. 9 is a perspective view illustrating another use of the present invention.
Figure 10:
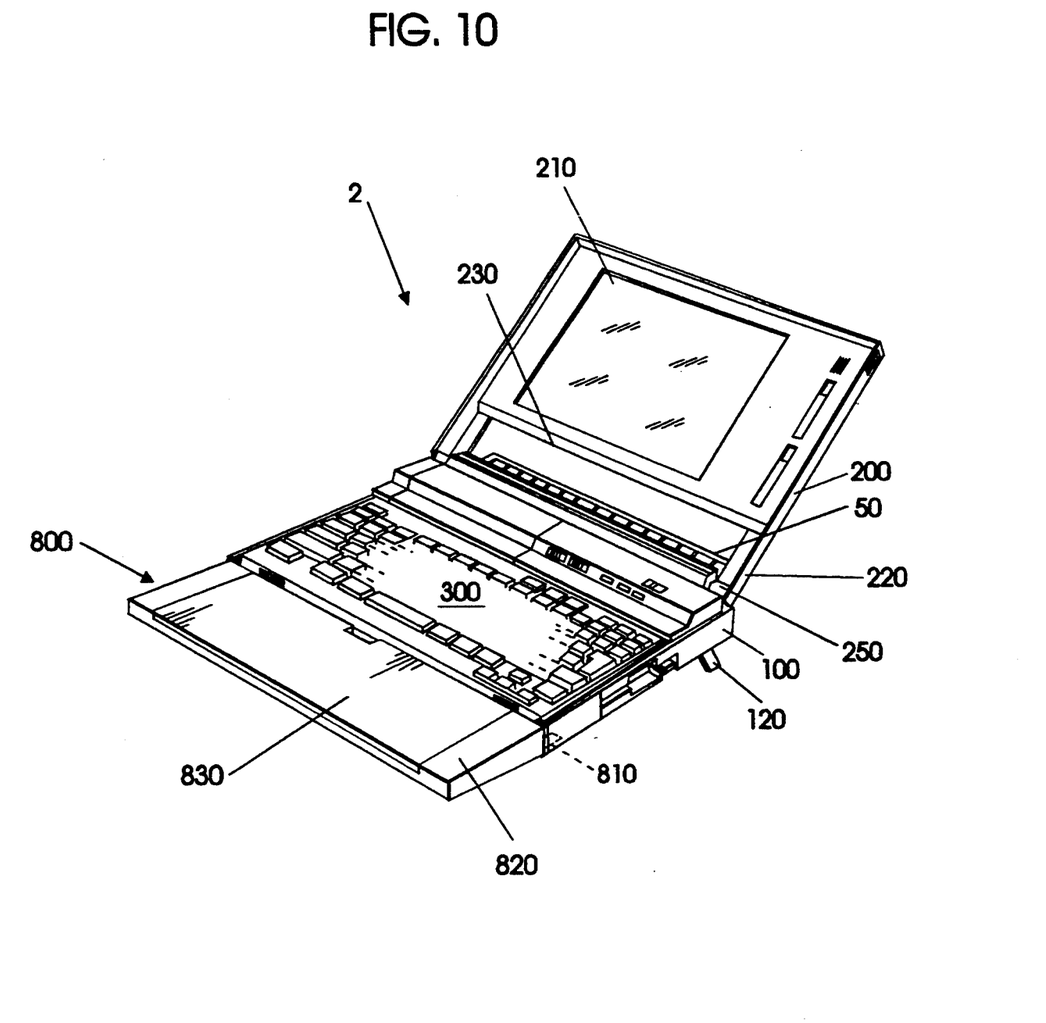
FIG. 10 is a front perspective view of a second embodiment of the present invention which includes a palm rest, wherein the palm rest is illustrated in the closed position.
Figure 11:
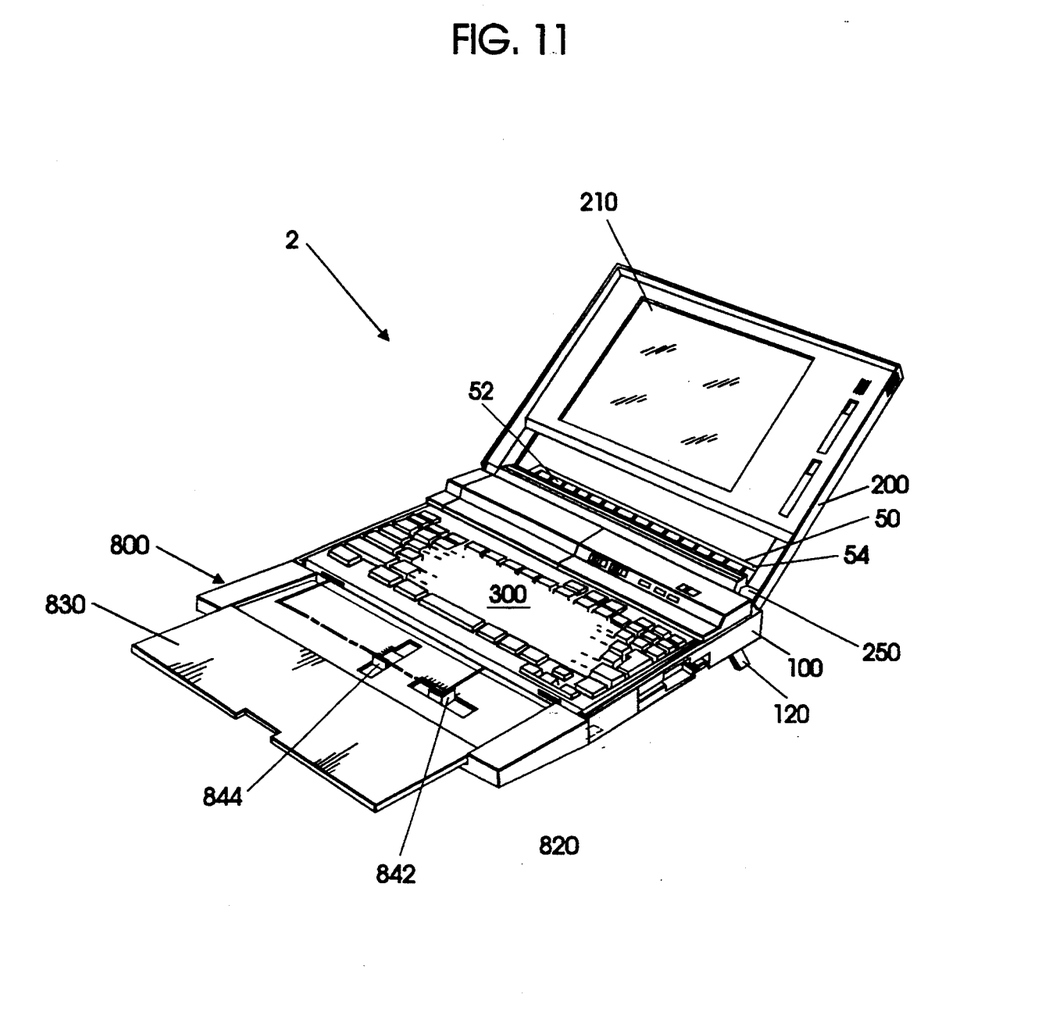
FIG. 11 is a front perspective view of the second embodiment of the present invention wherein the palm rest cover is illustrated in the opened position.
Figure 12:
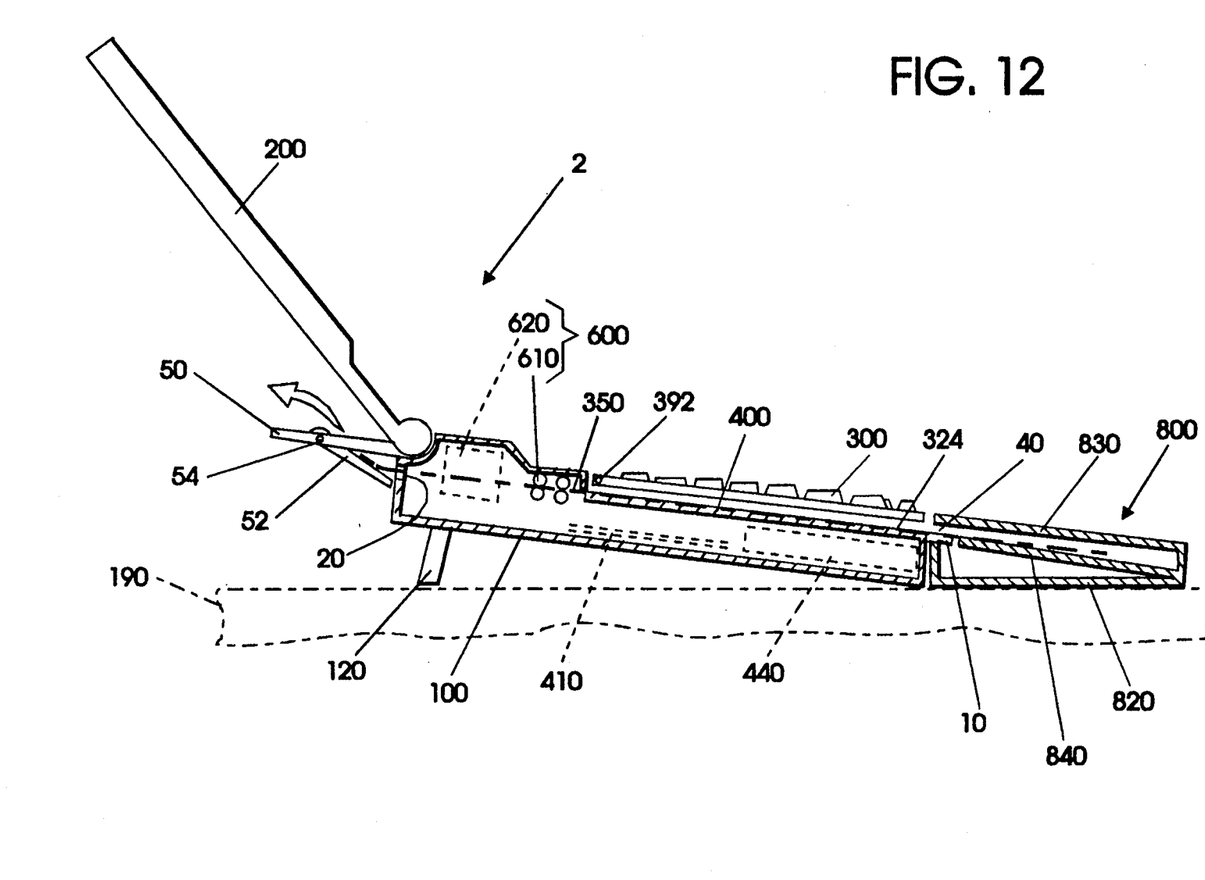
FIG. 12 is a sectional view (in which detail has been omitted) of the second embodiment of the present invention showing paper positioned in the printer.

FIGS. 1–9 illustrate a first embodiment of a computer system according to the present invention, while FIGS. 10–12 illustrate a second embodiment of the invention. In FIG. 1, a computer system 1 comprises a system body 100 and a cover 200, wherein the cover 200 is rotatably attached to the system body 100. Provided on both sides of the cover 200 is a latch 202, which allows the cover 200 to be opened after the latch is released. As shown in FIG. 3, a rotatable paper tray is attached to the front side of the system body 100. This rotatable paper tray 10 also serves as a paper entrance cover.

In FIG. 2, provided on the back of the system body 100 is a paper exit 20. Further, provided on the rear of the system body 100 are an external keyboard connector 102, a door cover 104, a serial interface connector 105, an external display connector 106, an external printer connector 108, a door cover 110, an expanded box connector 112, and an AC adapter connector 114. In addition to the external keyboard, a mouse, track ball, ten key keypad and the like are also connected to the external keyboard connector 102. A system power switch 116 is also provided on the rear of the computer.

In FIG. 3, provided on and adjacent to the system body 100 is a keyboard 300, which serves as an input device. When the paper entrance tray 10 is opened, a paper insertion slot 40 is disclosed along the lower side of the front edge of the keyboard 300. When the paper entrance tray 10 is closed, the paper entrance tray 10 is positioned vertically along the front side of the system body 100. When the paper entrance tray 10 is rotated to the horizontal position, the paper entrance 40 is exposed, such that a paper 400 can be easily fed into the paper entrance 40.

In FIG. 3, attached to predetermined positions close to the rear side at the bottom of the system body 100 are leg members 120 which can be turned in. When the leg members 120 are pulled out, the entire system body 100 is tilted and a proper inclination is given to the keyboard 300. Disposed behind the keyboard 300 at the top of the system body 100 are a speaker volume control switch 132, a display reverse switch 134, a carriage opening switch 136, and keyboard indicators 140. Disposed in the further rear portion of these switches 132, 134, 136, and keyboard indicators 140 are a printer power switch 632, an automatic carriage switch 634, a printer power indicator 636, and a paper position indicator 638. In addition, system indicators 642 for informing of each state of a HDD, a FDD, batteries, etc., a system power indicator 644, and a system suspend/resume switch 646 are also disposed. As shown in FIG. 1 and FIG. 2, the printer power switch 632, the automatic carriage switch 634, the printer power indicator 636, the paper position indicator 638, the system indicators 642, the system power indicator 644, and the system suspend/resume switch 646 are outwardly exposed even in the state where the cover 200 is closed.

Figure 6:
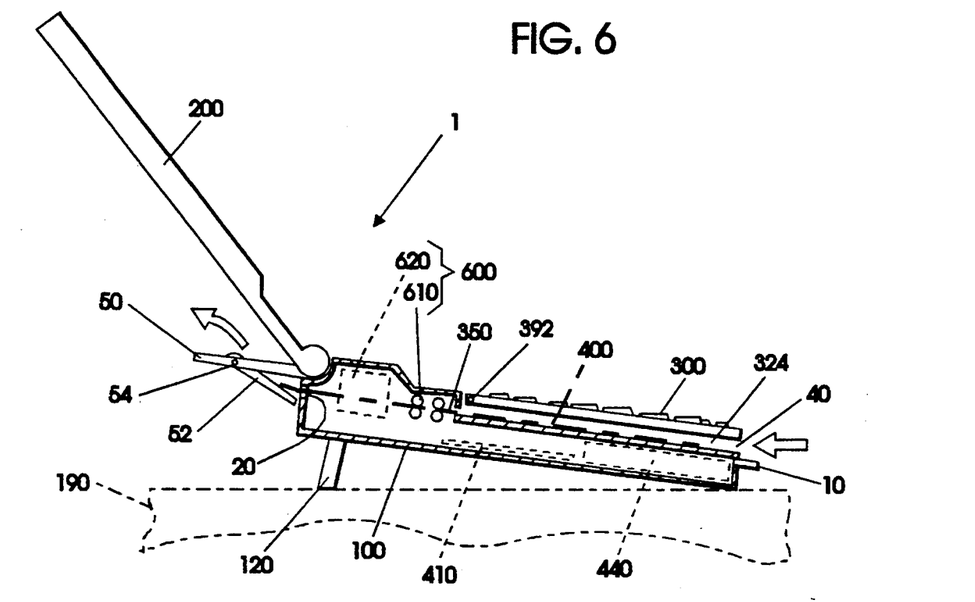
FIG. 6 is a sectional view (in which detail has been omitted) of the first embodiment of the present invention showing paper positioned in the printer.

In FIG. 3, provided to the inner surface of the cover 200 are a display section 210 such as a liquid crystal display panel and switches 212 for adjusting display on the display on the display section. The cover 200 is rotatably attached to the system body 100 through a supporting shaft 250 at its base edge. A paper exit tray 50 is also rotatably attached to the supporting shaft 250. The paper exit tray 50 is disposed between two leg sections 220 of the cover 200. Though the cover 200 and the paper exit tray 50 contact with each other when the cover 200 is closed, but the paper exit tray 50 can be rotated so as to be positioned apart from the cover 200 after the cover 200 is opened at an angle to be made when the system is in use. The paper exit tray 50 is provided with a blade 52, which is rotatably attached through a shaft 54, to the paper exit tray 50. When the end of the blade 52 near to the paper exit 20 is pushed down in the state where the paper exit tray 50 is in a roughly horizontal position, the edge of the blade 52 is disposed on the lower verge of the paper exit 20 so that a printed paper 400 ejected from the paper exit 20 may be received on the blade 52 (FIG. 6 and FIG. 8). Moreover, when the paper exit tray 50 is rotated away from the cover 200, an opening 230 appears between the two leg members 220. Through the opening 230, an operator can confirm the printed paper 400 ejected on the paper exit tray 50 from the front side of the system body 100.

Figure 4:
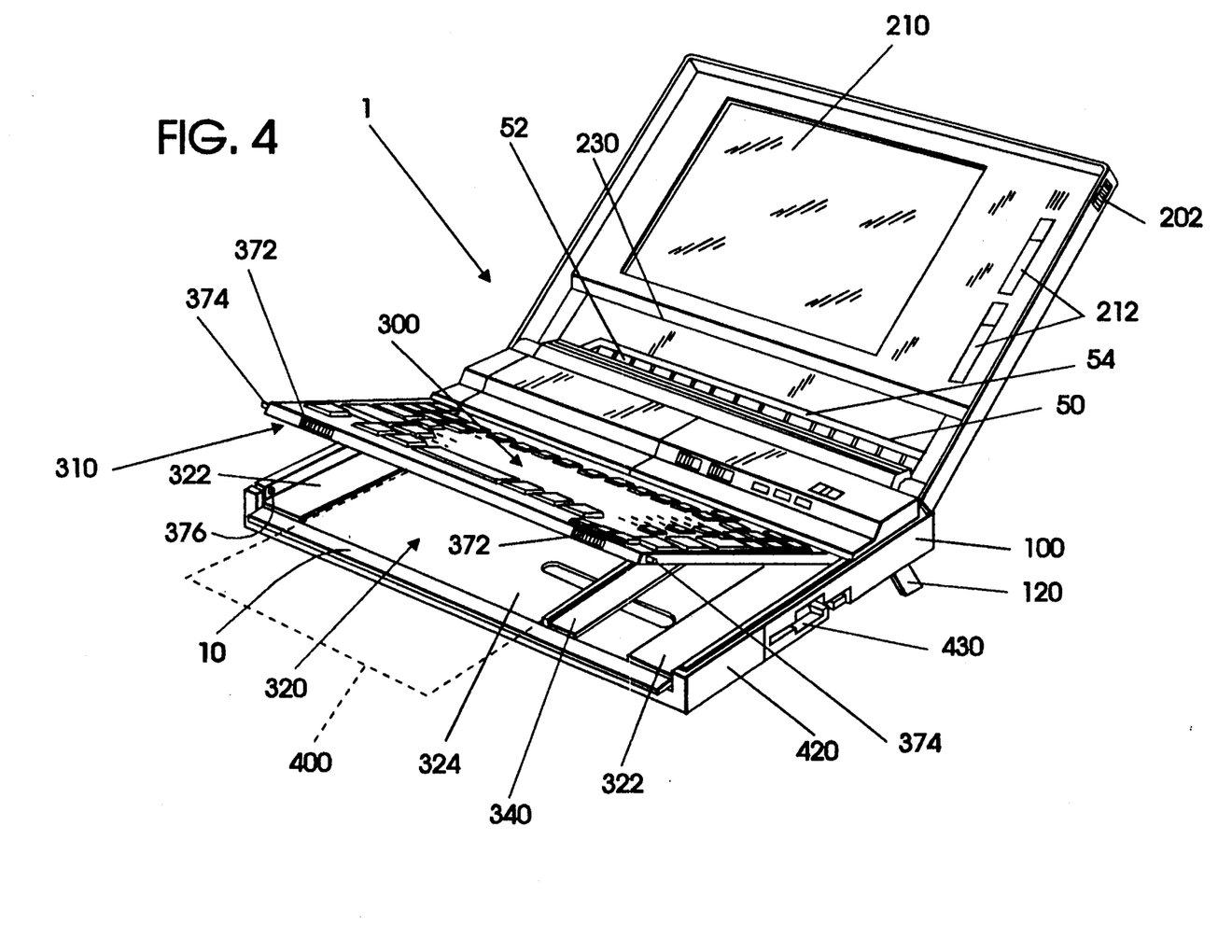
FIG. 4 is a front perspective view of the first embodiment of the present invention wherein the supporting section is exposed by rotating the keyboard away from the main body of the system.

As shown in FIG. 4, the keyboard 300 is rotatably attached to the system body 100. A bottom board 310 of the keyboard 300 has enough rigidity to support an internal board (not shown) of the keyboard 300 and enable a key input operation by an operator. In the keyboard 300, its rear edge is an axis of rotation and its front side (operator side) rotates upward and downward. Provided to the system body 100 is a head board 320, and even if the keyboard 300 is rotated upward away from the system body 100, the inside of the system body 100 is not exposed and the head board 320 is exposed.

Provided to the front edge (rotating edge) of the keyboard 300 are keyboard latching sections 372, and provided to the sides of the keyboard 300 are latch protrusions 374. Formed in a predetermined position of the system body 100 are latch concavities 376. When the keyboard 300 is placed on the system body 100, the latch protrusions 374 of the keyboard 300 engage with the latch concavities 376 of the system body 100. Such a construction surely prevents the keyboard 300 from being shaky during a key input operation. When the keyboard 300 is rotated, the latch protrusions 374 are released from the latch concavities 376 by operating the keyboard latching sections 372.

Convex sections 322 are transversely formed on both sides of the top surface of the head board 320 of the system body 100. In the state where the keyboard 300 is closed, the bottom board 310 of the keyboard 300 is supported on the convex sections 322. Formed between both the convex sections 322 is a paper pass 324 as a printing medium supporting section. The bottom surface of the paper pass 324 is lower than both the convex sections 322 so that a space corresponding to the height of the convex sections 322 may be kept between the bottom surface of the paper pass 324 and the bottom board 310 of the keyboard 300, even in the state that the bottom board 310 of the keyboard 300 is placed on the convex sections 322. Disposed in the space, that is, on the paper pass 324 are one or more than one sheet of the paper 400. Formed between the front edge of the paper pass 324 and that of the bottom board 310 of the keyboard 300 is the paper entrance 40. That is, the paper entrance 40 is positioned in the starting edge of the paper pass 324. Attached to the bottom surface of the paper pass 324 is a paper guide 340, which can move in the horizontal direction of the paper 400. The paper guide 340 makes carriage appropriate by guiding one side of the paper 400 in the paper pass 324.

Figure 5:
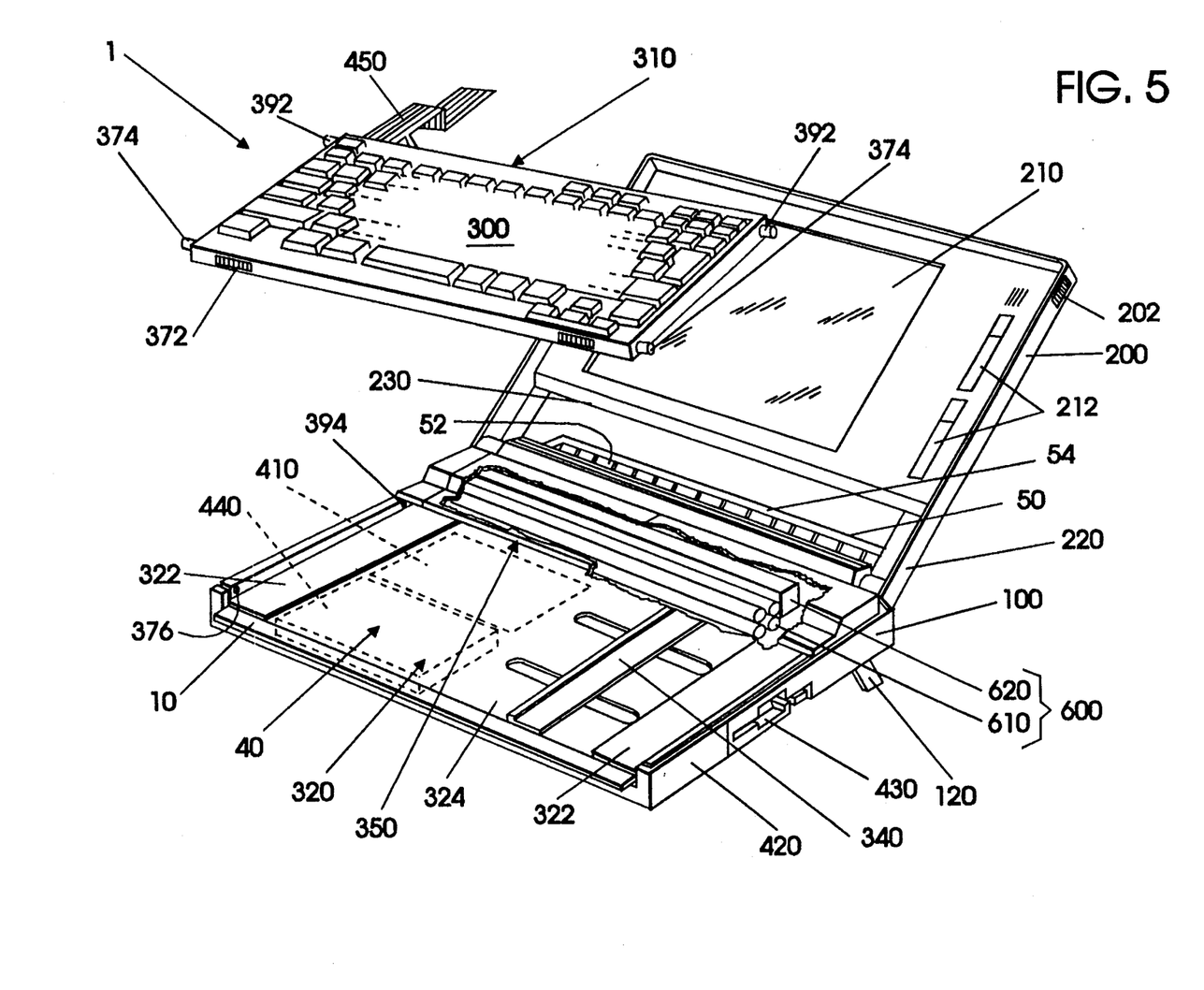
FIG. 5 is a front perspective view of the first embodiment of the present invention with the keyboard separated from the main body of the system.

As shown in FIG. 5, an opening 350 is positioned at the rear end of the paper pass 324. The opening 350 communicates with the inside of the system body 100, and the paper 400 in the paper pass 324 is guided, through the opening 350, into the inside of the system body 100. Disposed inside the system body 100 is a printer 600 as a printing means. The printer 600 has a carriage 610 and a printing mechanism 620. The paper 400 in the carriage 610 is fed in much the same position as the height of the opening 350, that is, that of the paper pass 324, and the carriage 610 is disposed just behind the opening 350. The paper 400 in the printing mechanism 620 is also fed in much the same position as the height of the paper pass 324, and the printing mechanism 620 is disposed at the further rear end of the carriage 610. The paper 400 in the paper pass 324 is fed, through the opening 350, to the printer 600, and the printed paper 400 is ejected from the paper exit 20 to the outside of the system body 100.

Provided below the head board 320 in the system body 100, that is, below the paper pass 324 are a system board 410, a hard disk storage apparatus 420, a floppy disk storage apparatus 430, and batteries 440. The system board 410 has such main circuits for processing information as a CPU, a system memory, a system bus, etc. mounted thereon. The system board 410 is connected, through a cable 450, to internal circuits for the keyboard 300. Further, the keyboard 300 has a shaft 392, which is rotatably attached to a bearing section 394 provided to the system body 100.

Figure 7:
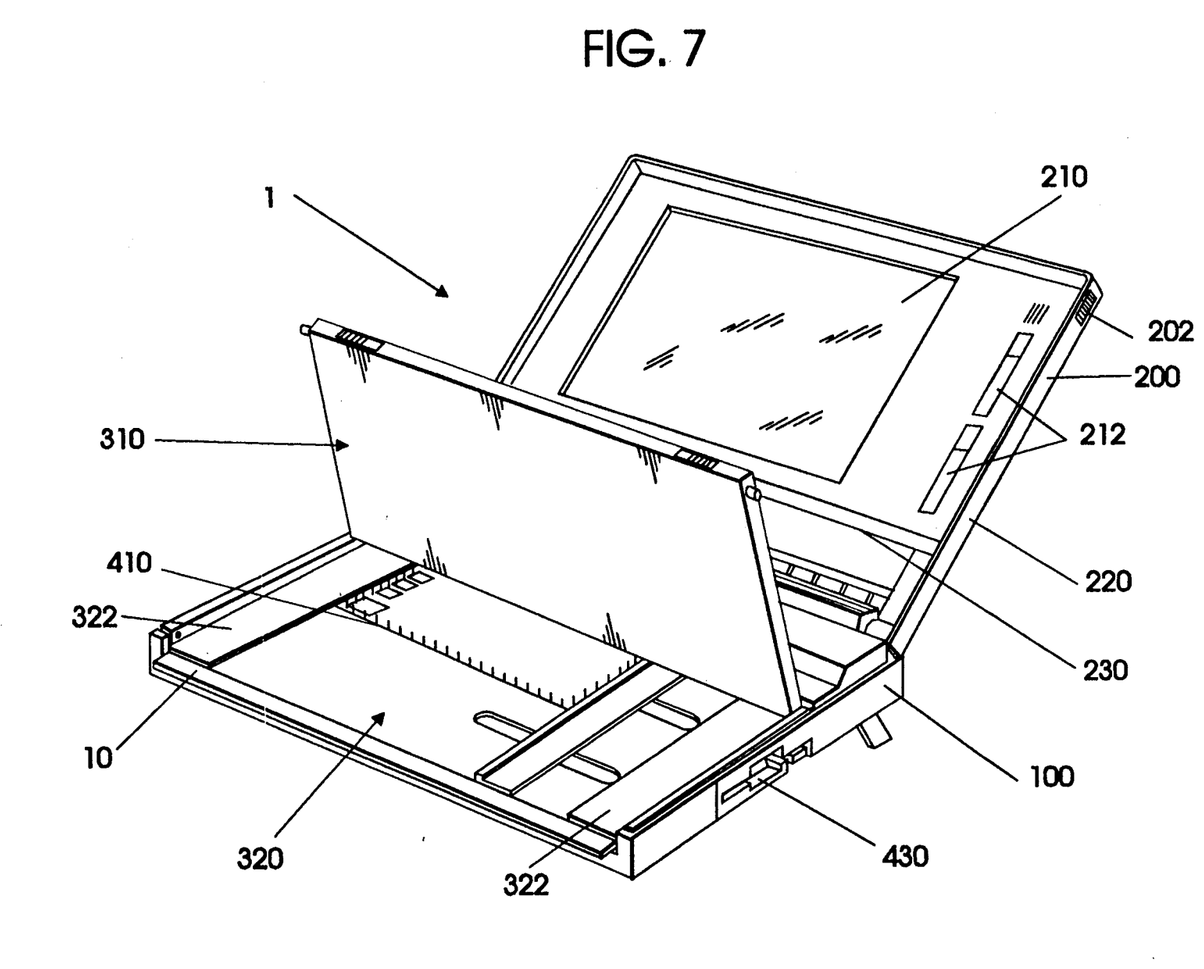
FIG. 7 is a front perspective view of the first embodiment of the present invention wherein the supporting section is exposed and an envelope or the like is placed in position.

The following is a description of how to use the embodiment. As shown in FIG. 3, first, the cover 200 is opened and the paper entrance tray 10 and the paper exit tray 50 are pulled out, and then the paper 400 is inserted from the paper entrance 10 into the paper pass 324 and the switches 632 and 634 for the printer are operated to feed and print the paper. The printed paper 400 is ejected from the paper exit 20. As shown in FIG. 6, the paper 400 is inserted into the paper entrance 10 and, after printing, is ejected from the paper exit 50 without being bent. As shown in FIG. 7 and FIG. 8, a small-sized printing medium 410 such as a postcard and an envelope is set into the paper pass 324 after causing the keyboard 300 to be lifted and the paper pass 324 to be exposed. In this case, since only the keyboard 300 is lifted without causing the system body 100 to be lifted, operation is very simple. FIG. 9 shows usage in the state where the cover 200 is closed. In FIG. 9, connected to the system body 100 are an external keyboard 710 and an external display apparatus 720. Even in the state where the cover 200 is closed, since the switches 632 and 634 and the indicators 636 and 638 for the printer are exposed outside, operation needed for printing can be properly performed with the cover 200 closed.

According to such an embodiment as described above, since the paper pass 324 is disposed between the keyboard 300 and the system body 100, the paper 400 can be inserted into the paper entrance 40 positioned in the front edge of the system body 100 and can be ejected from the paper exit 50 positioned at the rear end of the system body 100. Consequently, even if the paper 400 is set to the information processing system 1, the paper 400 does not overspread any of the keyboard 300, the display section 210, the switches 130s and 630s, or the indicators 140s and 640s, and thereby the paper 400 does not hinder each function of these sections and is not a hindrance to operation. Moreover, the paper entrance 40 is disposed not only in the front edge of the system body 100, but also at a height corresponding to the height of the upper part of the system body 100. Therefore, since even in the state where the system body 100 is placed on a desk 190, the paper entrance 40 is not so near to the desk, it is easy to insert the paper 400 into the paper entrance 40.

Further, by disposing the paper pass 324 between the keyboard 300 and the system body 100, the paper pass 324 can be disposed at the height of the head board 320 of the system body 100. Consequently, it is easy to dispose the paper pass 324 and the printing portion of the printing mechanism 620 in the printer 600 (that is, the position of the paper 400 fed in the printer 600) at a similar height, and therefore the printing medium can be printed without being bent. Still further, since the printing medium is not bent, it is also easy to print a cardboard, an envelope, or a postcard. Further, since the paper pass 324 can be largely exposed by rotating the keyboard 300, it is easy to set such a small-sized printing medium as an envelope and a postcard. Further, since the paper pass 324 can be largely exposed, it is also easy to remove the cause of a paper jam in the paper pass 324.

FIG. 10 to FIG. 12 show a second embodiment, and the description of the same or a similar part with said first embodiment is omitted or simplified using the same sign. In FIG. 10, an information processing system 2 has a palm rest 800 for resting the hand. The palm rest 800 is separably or integrally connected to the front edge of the system body 100 through connecting means 810. Before the palm rest 800 is connected to the system body 100, the paper entrance 40 should be previously opened by rotating the cover 10 for the paper entrance (see FIG. 2). The palm rest 800 has a palm rest body 820 and a cover section 830.

As shown also in FIG. 11, the front edge of the cover portion 830 is rotatably attached to the palm rest body 820. When the cover portion 830 is opened, a paper stocker 840, which is a printing medium supporting section formed in the palm rest body 820, appears. A paper width guide 842 is attached to the bottom surface of the paper stocker 840 so as to be able to move in horizontal direction of the paper 400. The paper width guide 842 is intended to guide the right side edge of the paper 400 in the paper stocker 840 so as to properly maintain the direction of paper feed to the printer 600. Further, an end guide 844 is attached to the bottom surface of the paper stocker 840 so as to be able to move in the direction of paper feed. The end guide 844 is intended to support the end of the paper 400 in the paper stocker 840 and prevent the paper 400 in the paper stocker 840 from sliding down. Still further, the bottom surface of the palm rest 800 is inclined, and therefore the front end of the system body 100 is not floated off when the system body 100 is used in a state where it was tilted by pulling out the leg members 120 from the bottom of the system body 100 (See FIG. 12).

According to such a second embodiment as described above, in addition to the above advantages of the first embodiment, the other advantages will become apparent in the following description. That is, in the second embodiment, even if the paper 400 is long enough to protrude from the paper entrance 40, the paper 400 does not touch an operator's hands during input operation. Therefore, not only the paper 400 does not hinder input operation, but also an operator's hands do not hinder proper paper feed. Further, it is possible to make the direction of paper feed smooth by loading the paper 400 in the paper stocker 840 along one side edge of the paper stocker 840. Still further, it is possible to make paper feed more smooth by using the guides 842 and 844. Further, since the palm rest serves both its original function and a paper housing function, construction in which parts are few in number can be provided.

Having described the embodiments of the present invention, the scope of the present invention is not limited by said first and second embodiments. For example, in said embodiments a keyboard is constructed so as to rotate in such a direction as opened at its front end, however it will be appreciated that it may be constructed so as to rotate in such a direction as opened on its left or right side, and the path of a printing medium may be formed so as to be exposed by moving a keyboard from a system body by means of construction free of rotation. Further, it will be appreciated that a keyboard may be immovably attached to a system body and the path of a printing medium may not be exposed. Still further, it will be appreciated that a paper entrance may not be provided. It will be appreciated also that a printer may be either separable or inseparable from a system body. Further, it will be appreciated that an information processing system according to the present invention may be either a personal computer or a word processor.

As described above, according to the present invention, it is possible to provide an information processing system with a printing function, in which it is easy to handle paper (printing medium), the printing medium does not hinder the functions of a display apparatus and indicators and the operation of a keyboard and buttons when the printing medium is set, and the printing medium can be easily printed without being bent.

What is claimed is:

1. A computer accessory for use in combination with a computer having a printer and a keyboard, said accessory comprising:
   a palm rest for supporting the palm of a computer user when the computer user is typing on the keyboard of the computer;
   a paper tray disposed at least partially within said palm rest for holding at least one sheet of paper and for guiding the sheet of paper into the printer of the computer; and
   means for connecting said palm rest to the computer and printer.

2. The computer accessory of claim 1, further comprising a movable cover, said cover being movable between first and second positions, said cover having a first surface suitable for resting the palm of a computer user upon said first surface when said cover is in said first position, said paper tray being accessible for loading the paper into said paper tray when said cover is in said second position.

3. The computer accessory of claim 2, further comprising adjustable paper width and paper end guides located in said paper tray.

4. An information handling system, comprising:
   a computer having a keyboard;
   a printer;
   a palm rest for supporting the palm of a computer user when the computer user is typing on said keyboard of said computer; and
   a paper tray disposed at least partially within said palm rest for holding at least one sheet of paper and for guiding the sheet of paper into said printer.

5. The information handling system of claim 4, wherein said palm rest and paper tray further comprise a movable cover, said cover being movable between first and second positions, said cover having a first surface suitable for resting the palm of a computer user upon said first surface when said cover is in said first position, said paper tray being accessible for loading the paper into said paper tray when said cover is in said second position.

6. The information handling system of claim 5, further comprising adjustable paper width and paper end guides located in said paper tray.

* * * * *